United States Patent

[11] 3,559,827

| [72] | Inventor | Francis E. Schier<br>715 S. First St., Oregon, Ill. 61061 |
|---|---|---|
| [21] | Appl. No. | 830,243 |
| [22] | Filed | June 4, 1969 |
| [45] | Patented | Feb. 2, 1971 |

[54] AUTOMOTIVE TOWING UNIT
14 Claims, 8 Drawing Figs.

| [52] | U.S. Cl. | 214/86, 280/402 |
|---|---|---|
| [51] | Int. Cl. | B60p 3/12 |
| [50] | Field of Search | 214/86A; 280/402 |

[56] References Cited
UNITED STATES PATENTS

| 2,937,772 | 5/1960 | Sullivan | 214/86(A) |
| 3,127,037 | 3/1964 | Newman | 214/86(A) |
| 3,415,397 | 12/1968 | O'Banion | 214/86(A) |

*Primary Examiner*—Albert J. Makay
*Attorney*—Andrew F. Wintercorn

ABSTRACT: This towing unit is a self-contained independent unit having its own battery and reversible electric motor operated hoist controlled by the operator with a two-battery switch block connected with the battery and motor through a long enough flexible cable to enable the operator to stand as close to or far from the work as he prefers or considers best. The tow frame, which is carried on two caster wheels that are spaced farther apart than the front wheels of a car and are detachable lockable in a fixed parallel relationship for steering is connectable to a tow car or truck with a conventional trailer hitch, and when uncoupled has its front end supported on a wheeled trailer jack. The frame has a upright generally rectangular frame or rack on its rear end onto which the end of a car to be towed is hoisted by pulley and cable means connected with a cable windlass driven in either direction by the electric motor through reduction gearing, the hoisted car being attached by chains to the rack at a selected elevation to transfer the weight to the chains and use the latter for towing. The caster wheels are carried in spring forks to cushion the load in transit.

INVENTOR
FRANCIS E. SCHIER

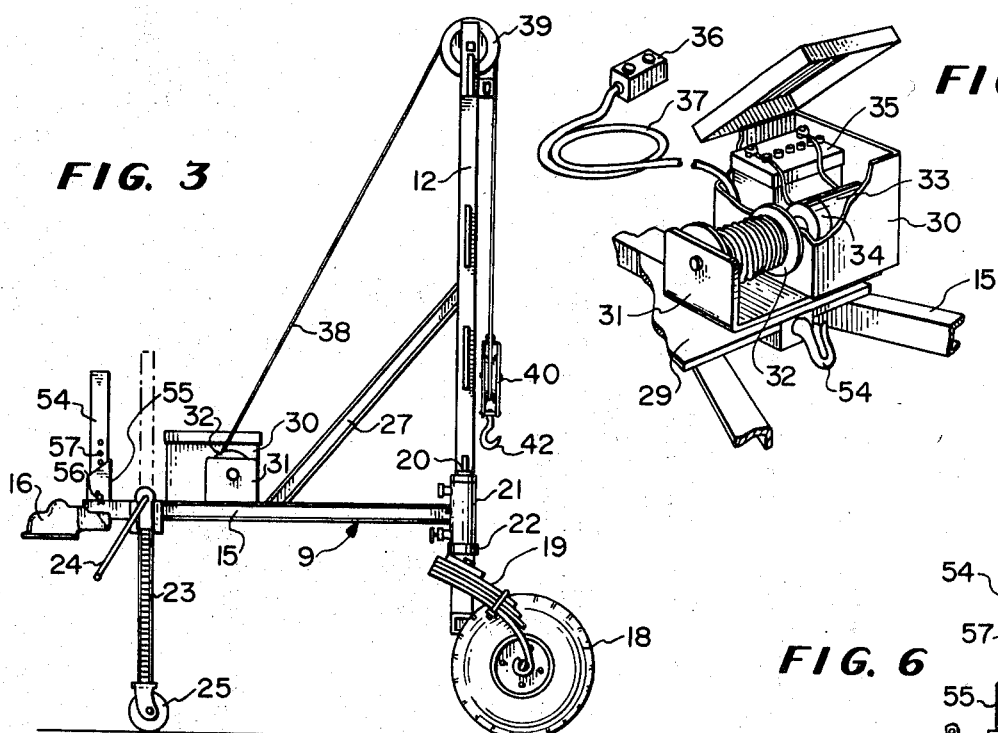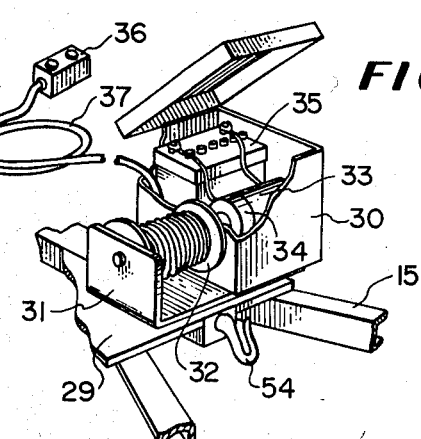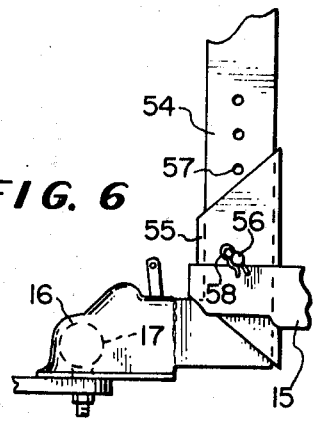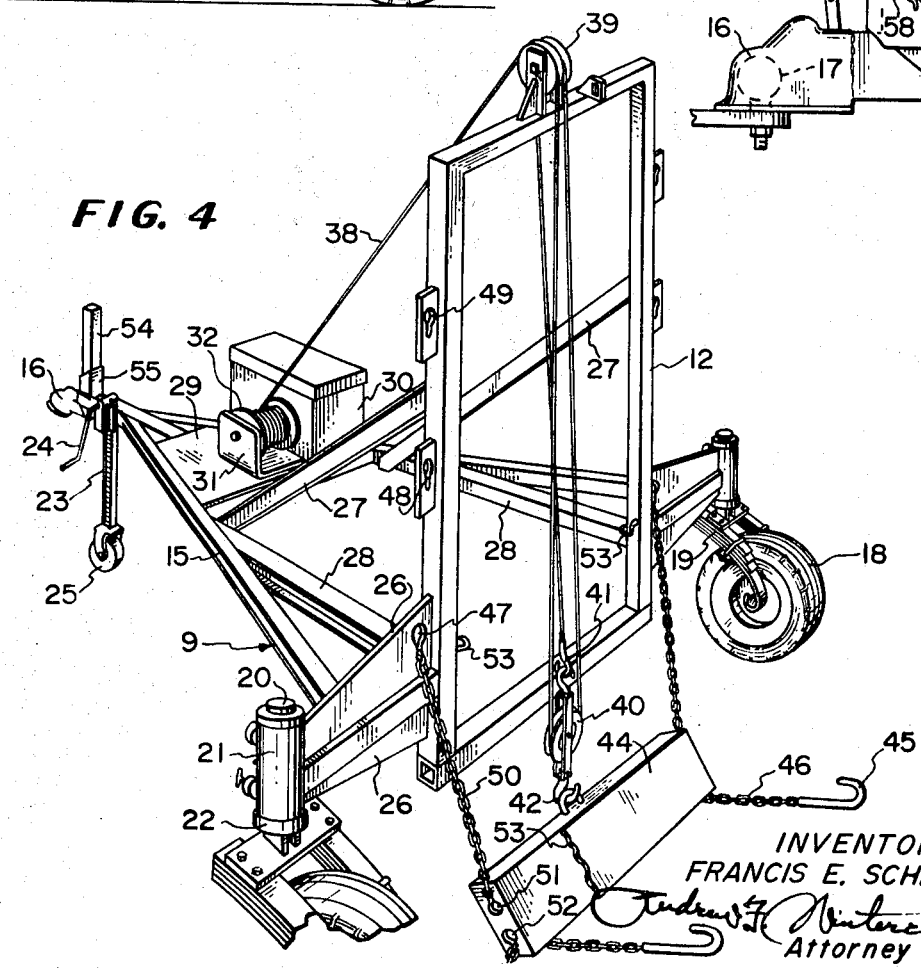

INVENTOR
FRANCIS E. SCHIER

AUTOMOTIVE TOWING UNIT

This invention relates to a new and improved automotive towing unit adapted for attachment by means of a conventional trailer hitch to the rear of a truck or automobile so that it may be uncoupled and left standing out of the way when not in use, a wheeled trailer jack being preferably provided on the front end of the horizontal V-frame of the towing unit for that purpose.

The principal object of my invention is to provide, as a self-contained independent unit, a compact, sturdy, as well as economical towing unit having an upright generally rectangular frame or rack on the rear end of the horizontal V-frame against which the bumper on either end of a wrecked or disabled vehicle is arranged to have abutment after being hoisted into the proper position by cable and pulley means carried on the upper crossbar of the rack with the cable extending downwardly and forwardly to a windlass that is driven through reduction gearing by a reversible electric motor carried with its battery on the forward end of the V-frame with the windlass. The weight of the hoisted vehicle is transferred to the rack by supporting and towing chains that are attached to the towed vehicle and are attachable to the rack in keyhole slots provided thereon at a plurality of elevations to suit different requirements, after which the load on the hoisting cable is relieved by reversing the electric motor, so that the chains take all the load until later when the process is reversed for disconnecting the chains from the rack after lowering the towed vehicle back onto its wheels, both operations of hoisting and lowering being greatly facilitated with the use of the reversible electric motor as a separate and independent power source, as contrasted with the awkward power takeoff drives heretofore commonly associated with the so-called "wreckers," the present operation being smooth and quiet and controllable to a nicety by the operator standing as close to the rack as he likes in order to observe the operation properly while he depresses the proper button on a two-button switch block that he carries in one hand, pressing one button for hoisting and the other for lowering.

Another object is to provide the towing unit with freely castering wheels mounted on the rear end of the frame at opposite sides of the rack, spaced far enough apart to be clear of the wheels of the towed vehicle and having spring mounts to cushion the riding of the towed vehicle, the vertical swivel posts for these wheels operating in antifriction bearings provided on the frame, but having provisions for releasably locking the same with the wheels in trailing right-angle relationship to the rack to facilitate backing the towing unit into place.

Other objects and advantages of the invention will be clear from the following description in which references are made to the accompanying drawings, wherein:

FIG. 1 is a perspective view of my improved automotive towing unit shown in use between a tow car and one being towed with its front end hoisted and supported on the towing unit;

FIGS. 2, 3 and 4 are, respectively, a rear view, side view, and perspective view of the towing unit itself to better illustrate its construction and to show how the trailer jack is used for support of its front end when uncoupled from the tow car, FIG. 2 showing one set of supporting chains for hoisting purposes while FIG. 4 shows a different one including a wide crossbar for straddling the bottom of the bumper for protection against marring by the chains, this being in lieu of the protective sleeves shown in FIG. 2;

FIG. 5 is a perspective view of the hoisting windlass and its its drive means and motor control switch block and flexible cable therefor, the box containing the motor and the reduction gear unit and battery being shown partially broken away with the cover raised to better illustrate all the parts;

FIG. 6 is an enlarged side elevation of the trailer hitch on the front end of the towing unit, showing its adjustable connection with the V-frame;

Similar reference numerals are applied to corresponding parts throughout the views.

Figure 1:
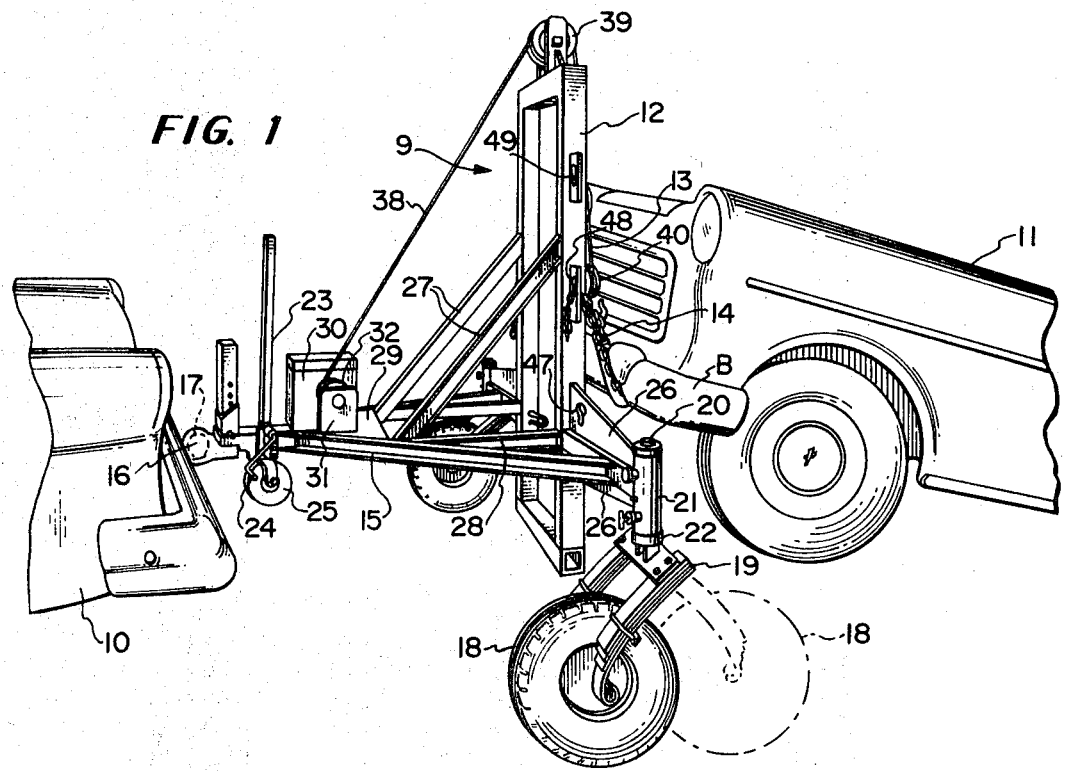
Figure 2:
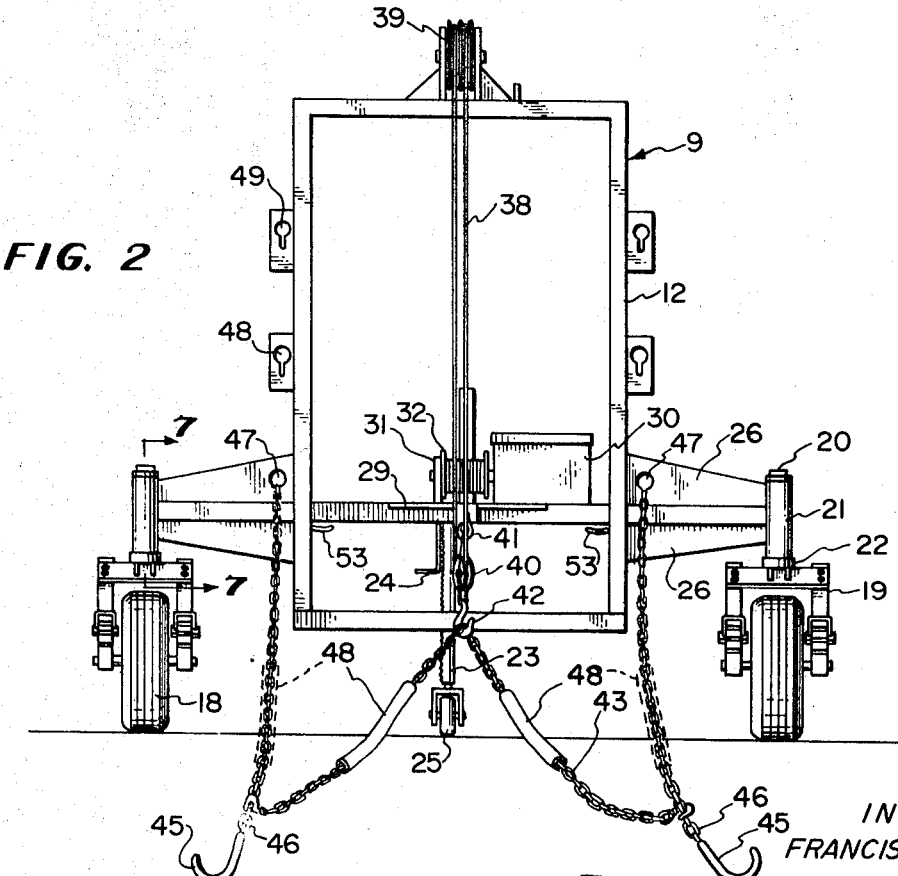

Referring to the drawings, the reference numeral 9 designates my improved automotive towing unit, which, as shown in FIG. 1, is designed to be used between a tow car or truck, a rear portion of is shown at 10, and the wrecked or disabled car or truck, only the front end portion of which is shown at 11 as having hoisted and attached to the upright generally rectangular frame or rack 12 of the unit 9, the horizontal forwardly extending V-frame 15 of the unit 9 carrying the socket part 16 of a trailer hitch for connection with the usual ball head 17 fixed on the rear end of the towing vehicle in the usual way to enable towing the vehicle 11 with either end hoisted and secured to the rack 12. as pair of wheels 2, 3 which are spaced farther apart than the conventional front or rear wheel on a car or truck to be towed, are carried in leaf spring forks 19 and have posts 20 swiveled in vertical bearing 21 on opposite sides of the rack 12, preferably on antifriction bearings 22 (FIG. 7), for free castering of the wheels, as indicated in dotted lines in FIG. 1, as required during the towing operation. When the towed vehicle is later lowered onto the floor in the garage or repair shop and disconnected from the towing unit, the towing unit may be uncoupled from the tow car or truck and left in any convenient out of the way place until there is a further need for it. A trailer jack 23, operable by a crank 24 and carrying a caster wheel 25 on its lower end, is provided on the front end of the V-frame 15 closely behind the socket 16 of the hitch and serves to support the frame 15 in a substantially horizontal position when the unit 9 is not in use, as shown in FIGS. 2, 3 and 4. With the three caster wheels 18 and 25, it is an easy matter to roll the tow unit 9 to an out of the way location and back again later to be coupled to the tow car or truck. The rack 12, besides being rigidly secured to the V-frame 15 and braced by gusset plates 26 above and below the plane of the V-frame, has channel iron braces 27 and channel iron stringers 28, all welded together and to the rack 12 and V-frame 15, to insure the desired strength and rigidity so as to handle easily whatever loads are apt to be imposed on the towing unit in all around use. A plate 29 welded onto the front end portion of the V-frame 15 serves to strengthen it and also to support and have fastened thereon a metal box 30 and the frame 31 of a windlass 32. The latter is driven by a reversible electric motor 33 (FIG. 5) through a reduction gear unit 34, both enclosed in the box 30 with a battery 35 and having for their remote control a two-button switch block 36 with a flexible conduit 37 extending therefrom, as shown in FIG. 5, enabling an operator to control the raising and lowering of the car or truck to be towed while standing close enough to the tow unit 9 to observe whether everything is proceeding properly in the unwinding or winding of the cable 38. The cable 38 extends from the windlass 32 over the fixed pulley block 39 provided on the upper end of the rack 12 and is adapted to be connected by hook and chain means to the vehicle to be hoisted and towed. The fixed pulley block 39 cooperates with the movable pulley block 40 where the free end of the cable 38 is connected, as shown at 41 in FIG. 4, so that a 5 to 1 ratio is effective in lifting the load with the hook 42 when using either the all chain hoist 43 of FIG. 2 or the modified bar form of hoist shown at 44 in FIG. 4, both forms having hooks 45 on chain extensions 46 for connection with the A-frame under the car or truck to the rear of the bumper B. With the ball-chain hoist 43 the chain is in a W-form with the opposite ends entered in keyhole slots 47 provided in the gusset plates 26 on opposite sides of the rack 12, and there are sleeves 48 of rubber or other protective material covering enough of the chains to engage under the bumper B in hoisting the car or truck, and then, when it is hoisted high enough, as in FIG. 1, the ends of two of the chains can be entered in selected keyhole slots 48 provided in projecting ears on opposite sides of the rack 12, an additional pair of keyhole slots 49 being provided at a still higher elevation in other ears on opposite sides of the rack as shown. Then the operator can reverse the motor 33 and relieve the tension in cable 38, leaving the car or truck supported entirely by the two chains 43 in keyhole slots 48 and 49, as the case may be, throughout the towing operation it being best to have the chain connections with the rack 12 as short as possible, as seen in FIG. 1, to eliminate, or at least reduce to a minimum, the banging of the bumper on the towed vehicle against the rack during towing.

With the other construction shown in FIG. 4 the chains 50 shown as inserted in the keyhole slots 47 at one end and inserted in keyhole slots 51 in the opposite ends of the bar 44 at the other end can, of course, be switched to keyhole slots 48 or 49 after the car or truck has been hoisted into towing position, as previously described, and, there again, the object should be to make the connections as short as possible to reduce, if not eliminate, banging of the bumper on the towed vehicle against the rack 12 during towing. The chains 46 are adjustable with respect to opposite ends of the bar 44 in other keyhole slots 52. The bar 44, as previously indicated, is made of channel steel construction with or without a protective mat covering 53 thereon of rubber or other cushioning material to protect the bumper B against marring.

To avoid to much clatter in running the towing unit out to the wrecked or disabled car or truck, a pair of hooks 53 is provided on opposite sides of the rack 12, as best seen in FIG. 4, onto which the hoist 43 or 44 can be hooked. Another hook 54 is shown in FIG. 5 behind the windlass 32 at the front end portion of the V-frame 15 where the hook 42 on the lower pulley block 40 can be attached, if desired, so as to be out of the way and safe from banging around in transit.

It is evident from FIGS. 3 and 6 that the socket 16 is adjustable vertically with respect to the V-frame 15 by means of its vertically extending square post portion 54 that is slidable vertically in a square sleeve 55 welded or otherwise suitably secured to the front end of the V-frame 15, a pin 56 extending through registering holes in opposite sides of the sleeve 55 and any one of a plurality of vertically spaced holes 57 to set the socket 16 at the right elevation with respect to the ball head 17 on the rear end of the towing car or truck. The pin 56 may have a head on one end (not shown) and a cotter pin 58 on its other end for removably securing the pin in place.

Figure 7:
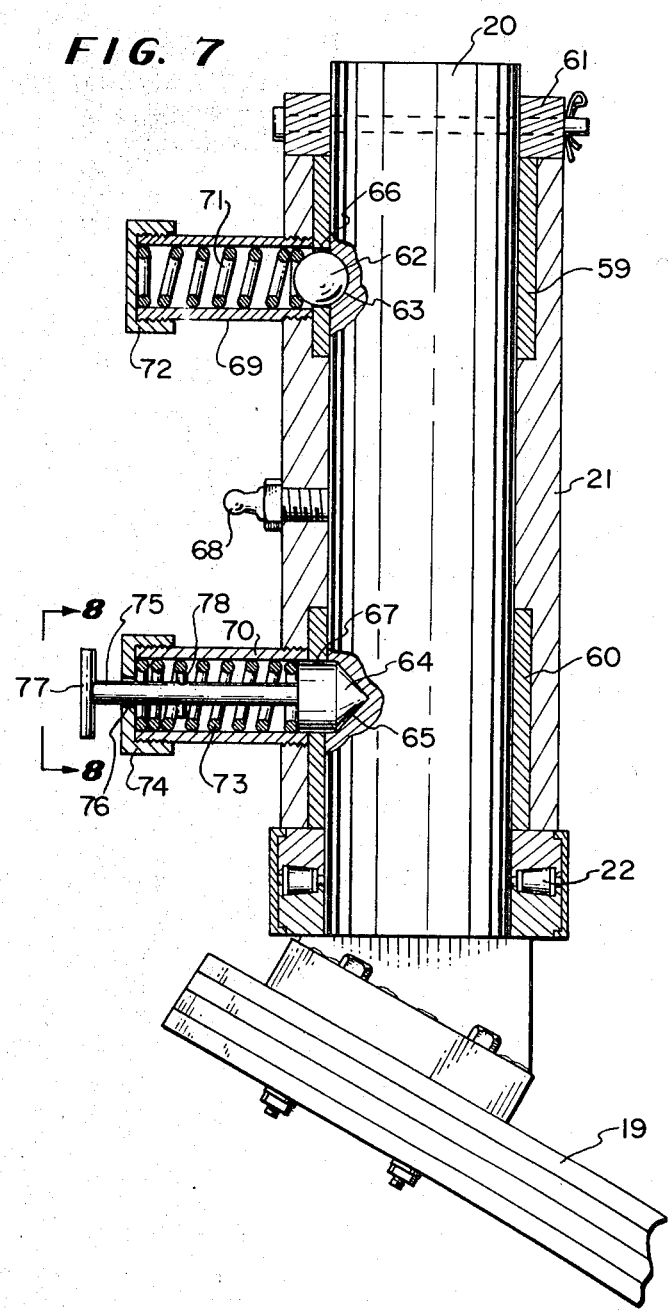
FIG. 7 is an enlarged vertical sectional detail on the line 7—7 of FIG. 2.
Figure 8:
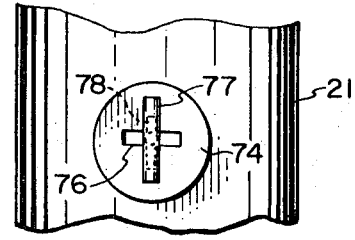
FIG. 8 is a fragmentary detail on the line 8—8 of FIG. 7.

Referring to FIGS. 7 and 8, which show the interchangeably swiveled or fixed caster construction for the two caster wheels 18, the bearings 21 for the wheels have the posts 20 swiveled in bearing sleeves 59 and 60, each bearing being provided in the lower end thereof with a conical antifriction bearing 22 interposed between the bearing and the fork 19 for easier turning and consequently better castering action of the wheels 18. A collar 61 pinned onto the upper end of each post 20 holds the post 20 against endwise movement, this being especially important with the present construction because of the necessity for keeping a detent ball 62 in the same horizontal plane with its cooperating recess 63, and also to keep the conically pointed locking pin 64 in the same horizontal plane with its cooperating conical recess 65 provided therefor in the post 20. The ball detent 62 works in a hole 66 provided in the bushing 59 while the locking pin 64 works through a hole 67 in the other bushing 60. A lubricator nipple 68 is provided on each bearing 21 between the two tubular housing 69 and 70 that are provided in connection with the ball detent 62 and locking pin 64 respectively. A coiled compression spring 71 received in the tubular housing 69 is retained by a cap 72 keeping the ball detent 62 under spring pressure tending to seat it in its recess 63. Similarly, another coiled compression spring 73 is provided in the other tubular housing 70 retained by a cap 74 tending normally to seat the locking pin 64 in its conical recess 65. However, the locking pin 64 has a reduced shank portions 75 extending forwardly therefrom through a center hole 76 in the cap 74 and a T-shaped handle 77 on its outer end that permits the operator to pull out the pin 64 against the action of the spring 73 to unlock the post 20, making it free to turn except only for the detent action of the ball 62, which is important only for locating the post 20 properly for annually locking it with pin 64. The hole 76 referred to before is an elongated slot, as seen in FIG. 8, to permit a crosspin 78 provided on the shank 75 intermediate its ends to be passed freely through the slot by turning the pin through 90° from a position shown in FIG. 8, after which the pin 64 can be releasably locked in its retracted position against the action of spring 73 by turning the pin into right-angle relationship to the slot 76 as it appears in FIG. 8. That is the way the caster wheels 18 are normally left, because it is only when the operator has both wheels in the dotted line position of FIG. 1 and locked in that position while backing the towing unit into the proper relationship to disabled or wrecked car or truck that is to be towed when the castering of the wheels 18 is not desirable, for obvious reasons.

In operation, the present towing unit fully complies with new state laws that forbid towing cars by chain or cable or pushing cars, the present unit being designed to permit hoisting the front or rear end of a car or truck clear of the road and supported on the rack 12 so that it can be towed with a stiff reach (V-frame 15) between the towing car or truck and the vehicle being towed, the latter being amply supported on the caster wheels 18 with leaf springs 19 serving to absorb and cushion the road shocks. The present unit requires only one man to do the whole job of picking up the wrecked or disabled car or truck and towing it.

It is believed the foregoing description conveys a good understanding of the objects and advantages of my invention. While preferred embodiment of the invention has been illustrated and described, this is only for the purpose of illustration, and it is to be understood that various modifications in structure will occur to a person skilled in this art.

I claim:

1. In a towing unit for automotive vehicles, a pair of wheels for rolling support of the unit, a frame on which said wheels are spaced farther apart laterally of the frame than the wheels of a conventional motor vehicle to be towed, the frame front including a substantially vertical rack, and a substantially horizontal V-shaped hitch portion extending forwardly from the lower portion of said rack and having means on its forward end for detachable pivotal connection with a towing vehicle, pulley means on the upper end of said rack, hoisting mechanism on the hitch portion of said frame including a windlass, a reversible electric motor drivingly connected with said windlass through reduction gearing, a battery furnishing a separate source of power for operation of a said electric motor, and a switch block having a flexible control cable extending therefrom and connected to said battery and motor for remote control of the latter in the operation of said windlass, a hoisting cable extending over said pulley means and connected with said windlass on the one hand to wind upon or be unwound from the same accordingly as one or the other of two buttons on the switch block is depressed, a pulley block connected with the other end of said cable to be raised and lowered relative to said rack and carrying a hook connectable with vehicle hoisting chain means detachably connectable with one end portion of a vehicle to be hoisted and towed, and a pair of load supporting chains detachable and each adjustably connectable and at one end to the opposite sides of said rack at any one of a plurality of vertically spaced points and connectable at their other ends with the aforesaid hoisting chain means, whereby to permit securing the hoisted end of the vehicle to be towed to the rack by said pair of load supporting chains for support thereof and also towing thereof independently of said hoisting cable when the latter is unwound from said windlass sufficiently to transfer the weight to said pair of load supporting chains.

2. A towing unit as set forth in claim 1 wherein the pair of wheels are caster wheels.

3. A towing unit as set forth in claim 1 wherein the pari of wheels are caster wheels and the rack is substantially in the same plane with the vertical swivel axes of said wheels.

4. A towing unit as set forth in claim 1 including a trailer jack on the forward end portion of said hitch portion of said frame lowerable relative to the same to a position providing with said pair of wheels a third point of support for the frame structure when uncoupled from the towing vehicle.

5. A towing unit as set forth in claim 1 wherein the pair of wheels are caster wheels, and jack having a caster wheel on the lower end thereof.

6. A towing unit as set forth in claim 2 including means for detachable securing the caster wheels in rigid right-angle relation to said rack.

7. A towing unit as set forth in claim 2 including means for detachably securing the caster wheels in rigid right-angle relation to said rack, and spring-pressed detent means on the frame cooperating with the swivels of said caster wheels for releasably holding said wheel in right-angle relationship to said rack.

8. A towing unit as set forth in claim 1 wherein the last-mentioned pair of chains is detachably and adjustably connectable at the trailing end to the hoisting chain means.

9. A towing unit as set forth in claim 1 wherein the last mentioned pair of chains is detachably and adjustably connectable at the trailing end to the hoisting chain means at the opposite end of a bumper bottom-engaging support bar.

10. A towing unit as set forth in claim 1 wherein the last mentioned pair of chains is detachably and adjustably connectable at the trailing end to the hoisting chain means at the opposite end of a bumper bottom-engaging support bar, the hoisting chain means including another pair of chains having hooks at one end for detachable connection to the frame structure of a vehicle to be towed and having adjustable detachable connections at the other end to the opposite ends of said bar.

11. A two towing unit as set forth in claim 1 wherein said rack having provided on opposite sides thereof a plurality of vertically spaced keyhole slots, through the large ends of which the forward ends of the pair of load-supporting chains are adapted to be extended for detachably and adjustably securing the chains to said rack at a selected elevation.

12. A towing unit as set forth in claim 2 wherein each of said caster wheels has a spring cushion fork for mounting the same on the frame, whereby to cushion road shock in the towing of a vehicle, one end of which is hoisted and supported on said rack in trailing relation thereto.

13. A towing unit as set forth in claim 9 wherein the rack is of generally rectangular form and of a width approximately the same as the length of the bumper bottom-engaging support bar, said rack having lateral extensions on opposite sides of the lower portion thereof providing supports on the outer ends thereof for the wheels that provide rolling support of the unit.

14. A towing unit as set forth in claim 1 including means for vertically adjustably mounting the detachable pivotal connection on the front end of the V-shaped hitch portion of said frame.